United States Patent [19]
Choe

[11] 4,332,006
[45] May 25, 1982

[54] BENCH-TYPE MECHANICAL LIGHT GENERATING DEVICE

[75] Inventor: Pil Y. Choe, Dunellen, N.J.

[73] Assignee: Man Bo, Inc., Dunellen, N.J.

[21] Appl. No.: 153,456

[22] Filed: May 27, 1980

Related U.S. Application Data

[63] Continuation of Ser. No. 949,525, Oct. 10, 1978, abandoned.

[51] Int. Cl.$^3$ .......... B62J 5/08
[52] U.S. Cl. .......... 362/193; 362/295
[58] Field of Search .......... 362/193, 295

[56] References Cited

U.S. PATENT DOCUMENTS

| | | | |
|---|---|---|---|
| 2,247,901 | 7/1941 | Alexander | 362/192 |
| 2,277,897 | 3/1942 | Alexander | 362/192 |
| 3,142,052 | 7/1964 | Tambert | 362/193 |

*Primary Examiner*—Stephen J. Lechert, Jr.
*Attorney, Agent, or Firm*—Richard J. Rodrick

[57] ABSTRACT

A portable mechanical light generating device includes an electrical generator located in a portable housing. The generator is activated by way of a rotatable shaft which rotates an armature within a magnetic field in order to produce electricity. A coil spring is adapted to be wound tightly and then slowly unwind. While unwinding, the spring turns a succession of gears in order to rotate the shaft associated with the generator. As a result, the slow unwinding of the spring allows the generation of electricity over sustained periods of time.

4 Claims, 6 Drawing Figures

BENCH-TYPE MECHANICAL LIGHT GENERATING DEVICE

This is a continuation, of application Ser. No. 949,525, filed Oct. 10, 1978 now abandoned.

BACKGROUND OF THE INVENTION

The present invention relates to a light generating device, and more particularly, concerns a portable mechanical light generating device which will provide a source of light without the need for batteries or standard house current.

Flashlights, lanterns and other similar devices for providing a source of light generally rely upon batteries for the source of energy for operability. When standard household alternating current is not available or, perhaps because the power has failed, it is common practice for one to rely upon a lantern or flashlight in order to provide at least emergency, temporary lighting conditions, albeit a localized light. Thus, whether it be in the home, automobile, boat, or merely in any dark condition, the flashlight or lantern not only is heavily used but also is indeed relied upon to deliver at least some source of light.

When no source of household current is available, the trust placed in a battery operated lantern may also be misplaced. Just as household, alternating current may fail or be unavailable, the same is true with battery operated devices. For instance, if the battery lantern is operated for prolonged periods the drainage of power saps the energy needed to keep the light bulb burning brightly causing the same to either dim or eventually fail. It can be seen that failure of the batteries in this situation can be very problematical especially if there are no backup batteries to replace the worn out batteries. In that case, the user of the lantern will have no light for his needs.

Not only are batteries subject to power dissipation when used, but the same thing occurs when the lantern with the batteries is merely put aside and stored. The disappointment of the lantern's performance becomes obvious when, in time of need, the user reaches for the lantern only to find that the batteries are weak or dead.

Perhaps the lantern may have been unused or unchecked for its reliability over a long period of time with the result that it is no longer functional for the user. This problem is significant since there may be a tendency to neglect checking the operability of a battery powered lantern especially since there may be a mistaken belief that the battery lantern is usually reliable.

In addition to the problems of reliability and eventual power dissipation, batteries have been known to corrode over periods of time. Any spillover of the batteries' acidic material will of course damage the electrical contacts inside the lantern or flashlight or may even do further damage thereby rendering the lantern useless.

Other deficiencies in battery operated lanterns or flashlights also arise; in particular, most standard batteries do not provide energy for significant amounts of light, and when the flashlight is made to be light-weight the amount of light expected to be delivered is not great. Also, most light-weight flashlights or lanterns are expected to be held by the user's hand so that any hand held lantern dim,nishes the user's ability to perform various duties which may require both hands.

It is known that small, hand held flashlights have been available to the public which are operable without standard household current or without standard dry cell batteries or the like. This small flashlight operates on the principal of constant and rapid squeezing of a lever which in turn causes rotation of components of a small generator contained within the flashlight package. The amount of light delivered by this flashlight is extremely minimal and lasts for about 1 second until the next squeeze of the lever is necessary. Using this type of device generally tires the operator's hands in a matter of minutes due to the constant squeeze-release sequence of the fingers around the lever. Of course, constant hand maniuplation means that the operator cannot perform work which requires use of both hands; therefore, this type of mechanical flashlight does not and has not served the need for a completely reliable mechanical light generating device. Accordingly, the present invention is directed to a portable mechanical light generating device which overcomes the problems and deficiencies as described above and serves other needs as well.

SUMMARY OF THE INVENTION

A portable mechanical light generating device comprises a portable housing and means in said housing for providing mechanical energy and for sustaining the same for prolonged periods of time. Means for converting the mechanical energy into electrical energy is provided to thereby produce sufficient electricity for energizing a lightbulb. Also included in the present device is means for providing the produced electricity to a connection for the lightbulb.

In the preferred embodiment of this invention, the means for converting mechanical energy into electrical energy is an electricity producing generator which includes a permanent magnet, a rotatable armature within the magnetic field of the magnet and a rotatable shaft attached to the armature so that rotation of the shaft rotates the armature to thereby produce electricity. A gear train is associated with the shaft for driving the same, with the gear train being driven by a coil spring connected at its outside end to a gear of the train. This coil spring is adapted to be wound tight and then to slowly unwind thereby turning the gear to which the spring's outside end is connected to drive the gear train.

Other embodiments of the present invention include mechanical control means for adjustably controlling the rotative speed of the generator, from zero speed to the maximum rotative speed provided by the gear train. This allows the operator to have a completely energized device but which may be turned on or off at the operator's discretion. A connection is provided for a lightbulb attachment, preferably a convenient plug-in type jack or detachable type electrical connector. This provides for interchangeability of the lightbulb and also makes storage of the device more convenient.

In accordance with the principles of the present invention, not only are the deficiencies of battery powered lanterns or small mechanical type flashlights overcome, but other advantages are offered as well. Principally, the present invention is portable and may be used in the home, automobile, boat or elsewhere. It is preferably made of lightweight material which is compatible with its portability. One of its primary advantages is its reliability to operate inasmuch as it does not require standard household current or batteries, the energy delivering system being completely mechanical. Thus, there are no extra wires needed to make a plug-in connection such as is required for AC devices, and no problems attendant with the use of batteries. In particular, the periodic maintenance and testing of batteries, which tend to wear out, and any of the corrosion effects from old batteries has been completely eliminated in the present invention. This increases the reliability of a light generating device especially when the need for a source of light arises out of an emergency situation. The present invention can be stored long periods of time without being used and still deliver adequate power to light up the work place. In one desirable embodiment of the present invention, the lightbulb connection is detachable to provide for ready interchangeability of lightbulb connections, and furthermore to assist in moving the light generating device around and for convenient storing. From the standpoint of effort, the mechanical energy providing mechanism, such as a spring coil, will provide prolonged periods of light, something in the order of 20 to 30 minutes, without the need for re-winding. Re-winding takes a minimal amount of effort, and once re-wound, a constant level of light will be provided for the work place.

Although the present invention is reliable and trustworthy, there is a minimal amount of moving components and straightforward structure, which also minimizes the initial expense of the device. Moreover, no incidental expense of providing batteries periodically or paying for household current arises when using the present invention. Accordingly, it can be seen that the advantages offered by the structure of the present portable mechanical light generating device fulfills a practical need for such a device.

DETAILED DESCRIPTION

Figure 1:
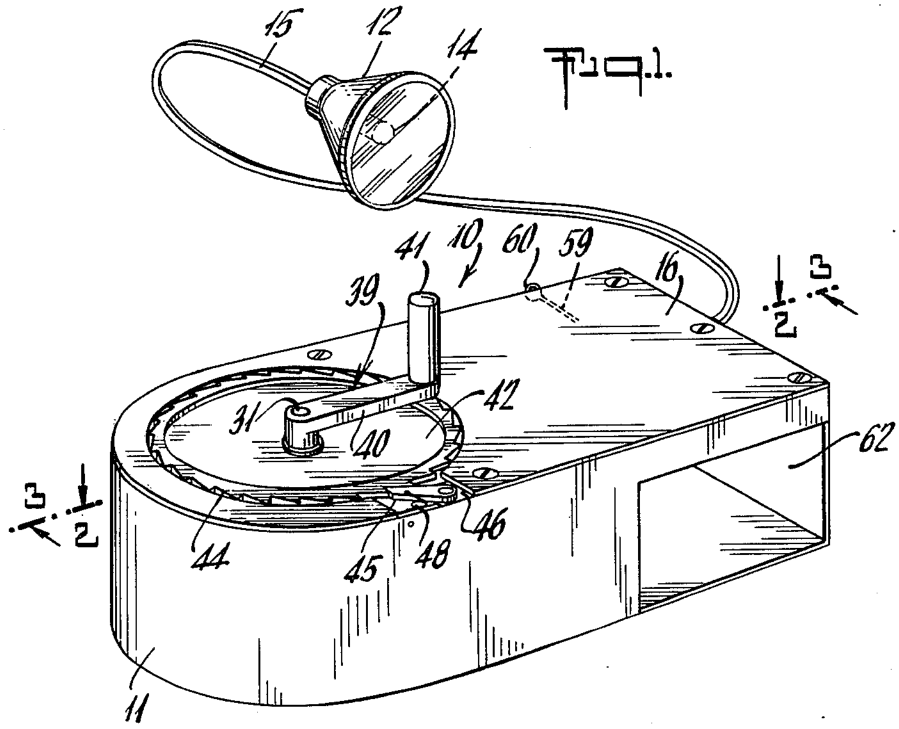
FIG. 1 is a perspective view illustrating the preferred embodiment of the portable mechanical light generating device.

While this invention is satisfied by embodiments in many different forms there is shown in the drawings and will herein be described in detail a preferred embodiment of the invention, with the understanding that the present disclosure is to be considered as exemplary of the principles of the invention and is not intended to limit the invention to the embodiment illustrated. The scope of the invention will be pointed out in the appended claims.

Referring to the drawings, particularly to FIG. 1, there is illustrated a portable mechanical light generating device 10. Device 10 includes a housing 11 which contains the various components to make the mechanism function. In order to impart a greater amount of flexibility to the portable nature of the present device, a light 12, normally consisting of a reflector and lightbulb 14 is conveniently plugged in and detachable to the housing of the device by means of electrical wire connection 15. Light 12 may include a stand, frame, support, hook or the like in order to be able to better position the light when the device is being used. Of course, when device 10 is being stored, light 12 is detachable merely by unplugging wire connection 15 from the device.

Figure 2:
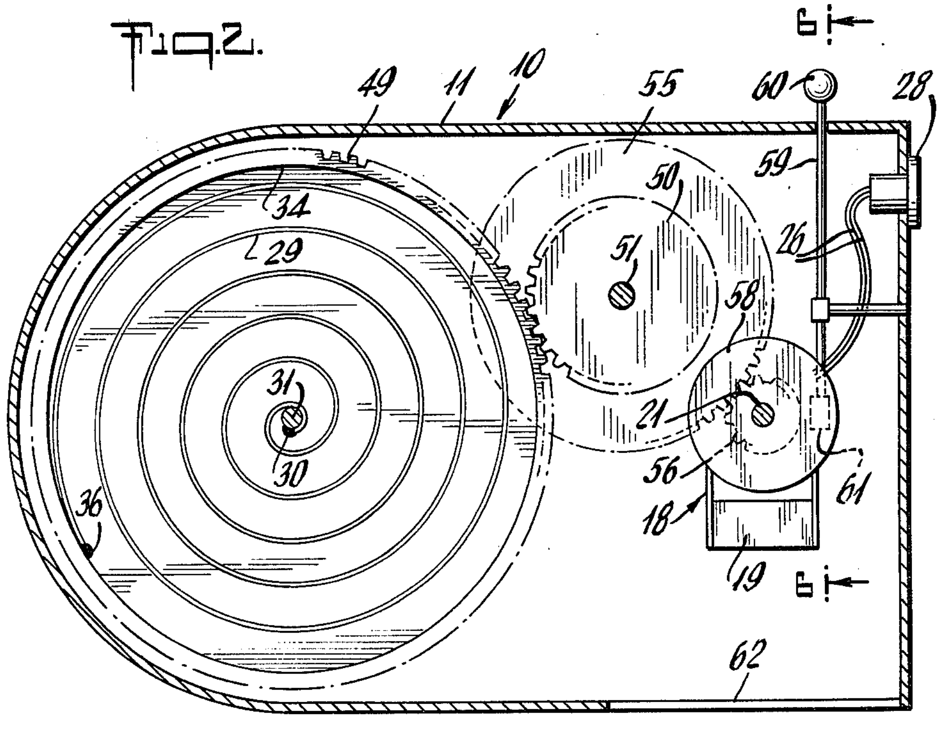
FIG. 2 is a cross-sectional view taken along line 2—2 of FIG. 1.
Figure 3:
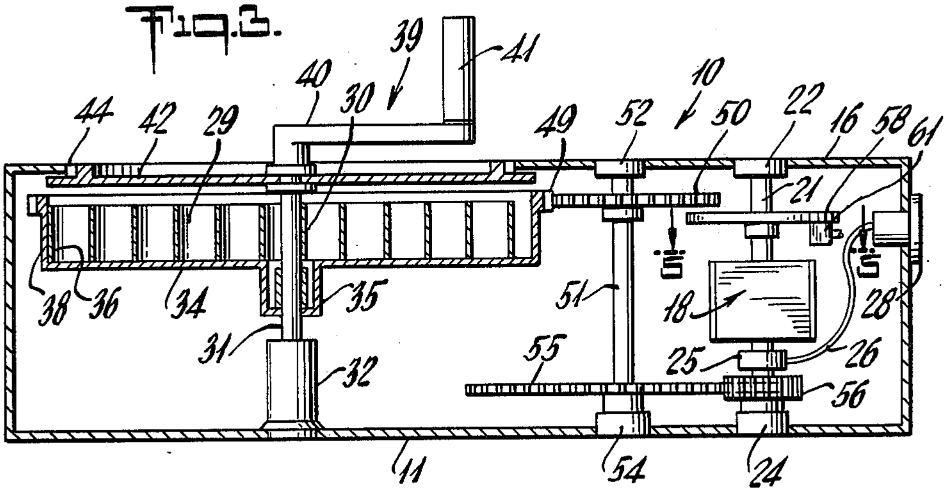
FIG. 3 is an enlarged cross-sectional view taken along line 3—3 of FIG. 1.
Figure 5:
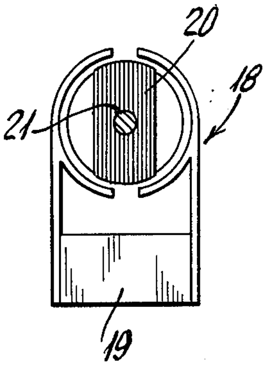
FIG. 5 is an enlarged cross-sectional view taken along line 5—5 of FIG. 3.

Turning now to FIGS. 2 and 3 taken in conjunction with FIG. 1, the working elements of light generating device 10 are more clearly seen and better understood. Housing 11 is essentially a container into or onto which the various working components are placed. Generally, the top portion of housing 11 is fabricated so as to be open and then is closed by cover 16 to protect the contents within. Of course, cover 16 is readily removable should need arise to gain access to the elements within. The shape of housing 11 is not critical and may take any form which is especially convenient for manufacture or fabrication. Inside housing 11 is an electricity producing generator 18. This generator is normally of standard construction and includes a permanent magnet 19 and an armature 20 of coils of wire around a metal core; armature 20 is adapted to rotate within the magnetic field produced by permanent magnet 19. Generator 18 is best illustrated in FIG. 5. In order to provide the rotation of armature 20, a rotatable shaft 21 is connected to armature 20. Shaft 21, essentially a long slender cylindrical rod, is affixed in housing 11 in conjunction with a bearing 22 at its upper most end and a similar bearing 24 at its lower most end in the housing. Also connected to shaft 21 and in conjunction with generator 18 is a commutator and brush 25; rotation of armature 20 in conjunction with a series of bars of the commutator and in conjunction with fixed brushes results in the current output from generator 18. It is appreciated that, in the generator, the magnet may be the rotating component with the armature remaining stationery. The net result is the same, i.e., the production of electricity. The electricity developed is taken from commutator and brush 25 by means of electrical wires 26 which are in turn connected to an electrical connector 28 mounted in the side wall of housing 11. Connector 28 may be selected from many different kinds of electrical connectors which will serve to provide a ready plug-in attachment for an electrical contact for the lightbulb connection.

In order to provide the mechanical energy to generator 18 for conversion into electrical energy, a coil spring 29 is employed in the preferred embodiment of the present invention. As seen more particularly in FIGS. 2 and 3, coil spring 29 consists of a series of circular loops substantially in the same plane; the end 30 of the spring at the inside of the coil and substantially at the center thereof is affixed to an axle 31. Axle 31 is a slender cylindrical rod which is connected to housing at its lower end by means of a bearing 32 so that axle 31 may turn freely. Supporting coil spring 29 is a cup-shaped receptacle 34 which is substantially concentrically mounted around axle 31. A collar 35 as part of receptacle 34 surrounds shaft 31 and is adapted to maintain the position of receptacle 34 with respect to axle 31, but is not affixed to axle 31 so that receptacle 34 may have relative rotative motion about axle 31. The outside end 36 of coil spring 29 is connected to the annular wall 38 of receptacle 34.

Figure 4:
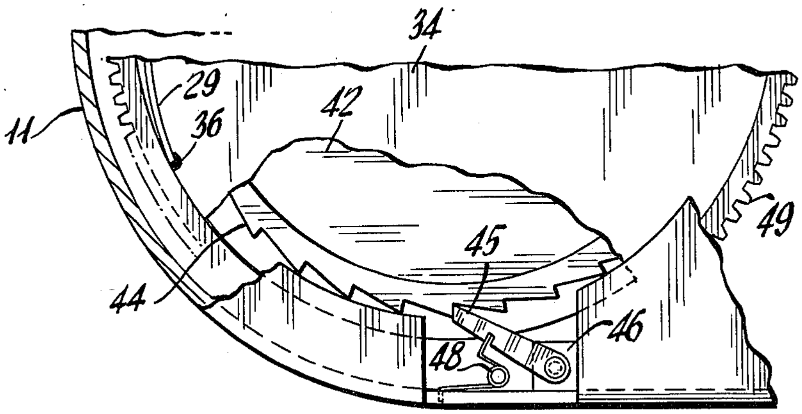
FIG. 4 is an enlarged fragmentary plan view illustrating the pawl and ratchet mechanism for winding the coil spring in the preferred embodiment of the present invention.

To tighten coil spring 29 (illustrated in its unwound, free state in FIG. 2), a winding mechanism 39 is provided. A flat bracket 40 is attached to the top end of axle 31, the bracket extending radially from the axle and substantially perpendicular thereto. A grip handle 41 is provided on the distal end of the bracket so that the operator of the device may readily grip the same for winding purposes. Handle 41 is preferably provided with a pivot pin so that it may fold down flat against bracket 40 for storage purposes thereby providing a neater package. It can be seen that winding bracket 40 will turn axle 31 and, in the embodiment being described, a clockwise rotation will tighten coil spring 29 inasmuch as the inside end of the spring is affixed to the axle. The mechanism for preventing the outside end 36 of the spring from turning during the winding operation will be described hereinafter. So that the spring will be permitted to be wound tightly while also being prevented from rapidly springing back to its wound position, a catching mechanism is also provided. As best seen in FIGS. 1, 3 and 4, a substantially flat plate 42 is also affixed to axle 31 at its upper most end just beneath bracket 40. Plate 42 has a circular shape and is adapted to turn with axle 31 without engaging wall 38 of cup-shaped receptacle 34. Circularly arranged toward the outside periphery of plate 42 are ratchet teeth 44. These teeth are raised slightly above the upper surface of plate 42 and are arranged to allow rotative movement in one direction only. A pawl 45 adapted to fall into the interdental spaces of ratchet teeth 44 is pivotally mounted on mounting block 46 which in turn is affixed to housing 11. A suitable spring 48 keeps pawl 45 biased in the direction of teeth 44 in order to assure that pawl 45 provides the proper catching and holding mechanism. Thus, coil spring 29 can be conveniently wound tightly by turning bracket 40, in this instance, in a clockwise direction until the spring is fully wound.

Once spring 29 has been wound so that it now possesses stored or potential mechanical energy, the tendency of the spring to unwind is captured and translated into kinetic energy. The inside end of the coil spring remains in a fixed position inasmuch as the ratchet arrangement prevents any rotation of the axle to which the inside end of the spring is attached. However, the spring is permitted to unwind by movement of outside end 36 which is connected to wall 38 of the cup-shaped receptacle. As mentioned earlier, receptacle 34, through its inside collar 35, is free to rotate about axle 31. This rotation of receptacle 34 need only be translated from the receptacle to generator shaft 21 by appropriate gear mechanisms in order to produce the intended electrical current. It is noted that on the outside periphery of wall 38 is an annular tooth section 49 which serves as a driving gear. An appropriate gear train is provided between driving gear 49 and axle 21. Thus, driving gear 49 meshes with first gear 50 attached to gear shaft 51. This gear shaft is mounted in housing 11 through bearings 52 and 54 so that shaft 51 is readily turnable. At the opposite end of shaft 51, second gear 55 is connected so that it may turn with shaft 51. Second gear 55 in turn meshes with third gear 56 connected to rotatable shaft 21. While the relative size of the various gears are somewhat proportionally shown, the end result is to turn shaft 21 at the speed of approximately four revolutions per second. Accordingly, the parameters of the spring employed, the size of the housing and other variables will allow one skilled in the art to select the proper gear ratio in the gear train to produce the desired rotative speed of shaft 21.

Figure 6:
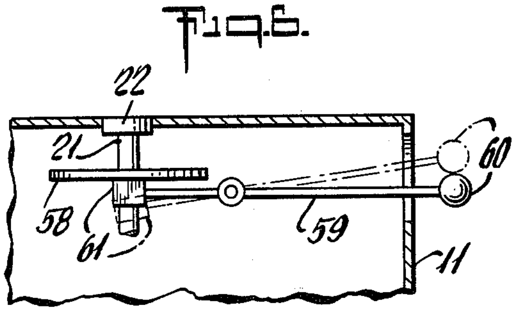
FIG. 6 is an enlarged cross-sectional view taken along line 6—6 of FIG. 2.

As mentioned above, a mechanism is provided to maintain the outside end of the coil spring stationary during the winding operation so that the spring can be tightly wound. This mechanism is more clearly seen in FIGS. 2 and 6. A substantially circular friction plate 58 is connected to rotatable shaft 21, and is adapted to rotate with the shaft. A long slender lever 59 is mounted in the housing 11 so that an end portion 60 is accessible outside the housing. Lever 59 extends inwardly toward friction plate 58. At the opposite end of lever 59 is a friction weight 61. By appropriate notching or the like in the wall of housing 11, the lever is adapted to be selectively moved so that friction weight 61 may either contact friction plate 58 or be moved away from the plate. When the lever is positioned so that friction weight 61 is completely pressed against plate 58, the device is in the "off" position. This effectively holds rotatable receptacle 34 in a fixed position through the intervening gearing mechanisms, accordingly, the outside end of the coil spring is maintained in a fixed position so that the spring may be wound by the winding device. Movement of the accessible portion of the lever toward the "on" position lessens the weight which the same is pressed against the plate and will therefore allow rotative movement of the entire gear train mechanism; complete movement of friction weight 61 from the friction plate of course allows the maximum rotative speed which can be provided by the rotating elements. Thus, the adjustable control afforded by lever 59 not only controls the rotative speed of the generator, but also assists in the spring winding operation.

In operation, once coil spring 29 has been wound, its slow unwinding, in the embodiment being described, turns generator shaft 21 at a speed of approximately 4 revolutions per second. This is sufficient to generate an energy level of 3 volts at 500 milliamps which is sufficient to light an appropriate lightbulb. This energy level is sustained for periods of 15 to 20 minutes, and perhaps even longer, without the need for rewinding to re-energize the system. To wind the coil spring tightly, housing 11 has a foot space 62 (as seen in FIG. 1) provided in a cavity-like fashion. A front portion of an operator's foot is placed in foot space 62 during the winding of the coil spring, thereby serving to stabilize the device during the winding operation. Approximately 30 turns of the coil spring will provide the capability for 15 or 20 minutes of sustained operation.

Various materials may be used to fabricate the present light generating device, the choice being left to the fabricator. It is preferable that all movable components be fabricated from a non-magnetic material so as not to disturb the electricity producing capability of the generator. From the standpoint of dimensions, a typical device as illustrated in the drawings is approximately 15 inches (38.1 centimeters) long by 12 inches (30.5 centimeters) wide by 6 inches (15.2 centimeters) high. Of course, these dimensions are by no means critical and may be modified if desired.

Thus, the present invention provides a portable mechanical light generating device, which operates without the need for standard household current or dry cell type batteries, which will provide a source of light for prolonged periods of time before reenergizing is required.

What is claimed is:

1. A heavy-duty portable mechanical light generating device intended for operation on a supporting surface comprising: a housing being sufficiently large to accommodate heavy-duty internal components and to be generally portable but being inconvenient for hand-held operation so that it is adapted to operate on a supporting surface; an electricity producing generator in said housing including a permanent magnet, a rotatable armature within the magnetic field of said magnet and a rotatable shaft attached to said armature so that rotation of said shaft rotates said armature to thereby produce electricity; a gear train associated with said shaft for driving same, said gear train being driven by a heavy-duty coil spring connected at its outer end to a gear of said train, said coil spring adapted to be wound tight in a substantially circular plane, said spring adapted to slowly unwind thereby turning said gear to which its outside end is connected to drive said gear train for a prolonged period of time without re-winding; mechanical control means for variably controlling the rotative speed of said generator from zero speed to the maximum rotative speed provided by said gear train; and an electrical connector in said housing electrically connected to said generator and adapted to provide a ready attachment for the electrical contacts of a lightbulb.

2. The device of claim 1 which further includes a footspace serving to stabilize said device during said spring winding.

3. The device of claim 1 wherein said control means includes a friction plate connected to said shaft and adapted to rotate with said shaft, and further including a movable lever having an end portion accessible outside said housing, another portion of said lever including a friction weight adapted to selectively contact said friction plate depending upon the movement of said lever by its accessible portion, said speed of said friction plate and said rotatable shaft being controlled by the degree which said friction weight is pressed against said friction plate by selective movement of said lever, said weight being sufficiently heavy to prevent unwinding of said heavy-duty spring when said spring is fully energized in the wound condition, thereby serving to selectively stop the generation of light.

4. The device of claim 1 wherein said heavy-duty spring is adapted to drive said gear train for a prolonged period of at least fifteen (15) minutes of operation at maximum speed of said generator without re-winding.

* * * * *